United States Patent [19]

Harris

[11] Patent Number: 4,815,201
[45] Date of Patent: Mar. 28, 1989

[54] TUBE TRAVELER DEVICE

[75] Inventor: Richard T. Harris, Ooltewah, Tenn.

[73] Assignee: Harris Tube Pulling and Manufacturing Company, Ooltewah, Tenn.

[21] Appl. No.: 543,792

[22] Filed: Oct. 21, 1983

Related U.S. Application Data

[63] Continuation of Ser. No. 212,160, Dec. 2, 1980, abandoned.

[51] Int. Cl.⁴ ............................................. B23P 19/04
[52] U.S. Cl. ..................................... 29/727; 29/426.4; 226/187; 254/29 R
[58] Field of Search ....................... 29/726, 727, 426.5, 29/252, 426.4; 254/29 R, 93 R; 226/186–188; 271/273–274; 72/246

[56] References Cited

U.S. PATENT DOCUMENTS

| | | | |
|---|---|---|---|
| 1,591,322 | 7/1926 | Karmazin | 29/727 |
| 1,950,623 | 3/1934 | Owston | 29/727 |
| 3,339,393 | 9/1967 | Rice | 72/246 |
| 3,785,026 | 1/1974 | Ohmstede | 29/157.4 |
| 3,924,316 | 12/1975 | Matlock et al. | 29/726 |
| 4,033,496 | 7/1977 | Rolfe | 226/187 |
| 4,044,444 | 8/1977 | Harris | 29/727 |
| 4,125,928 | 11/1978 | Cawley et al. | 29/282 |
| 4,132,099 | 1/1979 | Elsener | 72/175 |
| 4,150,477 | 4/1979 | Orr | 29/252 |

FOREIGN PATENT DOCUMENTS 1315664  5/1973  United Kingdom .

Primary Examiner—Daniel C. Crane
Attorney, Agent, or Firm—Vincent L. Barker, Jr.

[57] ABSTRACT

An extractor for pulling individual tubes from a tube sheet in a heat exchanger. The extractor includes a pair of serrated, drive wheels or drivers mounted in a housing on parallel rotating shafts. The tube drivers have inclined teeth which project into opposite sides of a passageway along which a tube is drawn. The spacing between the drivers is adjustable to accommodate different sized tubes, and the drivers are spring biased towards each other, to provide a constant gripping force on a tube within the passageway. The drivers are respectively rotated by two hydraulic motors, with the hydraulic power supply connected in series, thereby providing substantially synchronous rotation of the drivers.

6 Claims, 2 Drawing Sheets

TUBE TRAVELER DEVICE

This application is a continuation of Ser. No. 212,160, filed Dec. 2, 1980, now abandoned.

BACKGROUND OF THE INVENTION

Many heat exchangers are of an indirect type which employs tubes for carrying a heat transfer fluid. A large number of tubes are mounted to extend in a parallel array between two supporting tube sheets in the heat exchanger. The tubes are pressed fit into or expanded into engagement with openings through the tube sheets, thus forming a fluid tight seal. A heat transfer fluid, such as water, is circulated through the parallel tubes between the tube sheets while a higher temperature fluid, such as combustion gases or heated water, is circulated past the exterior of the tubes between the two tube sheets for achieving an indirect heat transfer between the two fluids.

It is sometimes necessary to remove tubes from the tube sheet in which they are mounted. Removal may be necessary for many reasons, such as leaks in the tube or excessive scale accumulations within the tubes. The removal and replacement of tubes may be done on a regular preventative maintenance schedule. In any case, the replacement operation entails costly downtime for the heat exchanger. This is particularly true in the case of large electric power generating equipment where a given installation may have thousands of tubes and downtime is costly to the owner and can be inconvenient to the power customer.

To remove tubes from such a heat exchanger, the interference fit between the tube end and the tube sheet is first relieved, then the tube is axially moved several centimeters to present an end projecting beyond the tube sheet which may be gripped by a tube extractor. Typical of tube pulling devices is that shown in commonly-owned U.S. Pat. No. 3,835,520 or in U.S. Pat. No. 3,628,246.

Once the tube has been broken loose and axially moved to expose an end beyond the face of the tube sheet, it is gripped by another device of the type shown herein which rapidly moves it out of the tube sheets. Inasmuch as some tubes in such large power installations may be 10-20 meters long, the rapid removal by an extractor device is necessary to effect good economics during serving. Prior art devices for removing long tubes from tube sheets axially at high rates of speed are disclosed in U.S. Pat. Nos. 3,149,021 (Curfman) 3,785,026 (Ohmstede), and 4,044,444 (Harris) the latter being commonly owned by applicant. These devices generally comprise at least a pair of rotating rollers or drivers mounted on parallel axes and adapted for engaging in the nip a tube extending between the drivers. The drivers are rotated in opposite direction to impart an axial motion to the tube.

To provide the most efficient gripping forces between the drivers and the tubes, it is preferable that the drivers rotate synchronously, without the possibility of relative slippage between them. The apparatuses disclosed by Harris and Curfman et al. assure this desired synchronization by gearing the drivers together for operation by a single motor. However, the necessary spur gears and means for mounting them add considerable weight and expense to the extractor, increasing the difficulty of the extraction process.

Moreover, the use of spur gears to assure synchronous rotation of the drivers, as disclosed by Harris and Curfman et al., requires that the shafts mounting the gears and drivers be at a fixed distance to each other, to assure proper intermeshing of the gears. This requirement renders it difficult to adapt the extractor to accommodate tubes of different diameters.

As disclosed by Harris and Ohmstede, it has been found advantageous to grip tubes between drivers with a force sufficient to deform the tubes as they are drawn out of the tube sheet. However, scale accumulations within a tube may be sufficient to form a plug that interferes with the deformation of the tube by the drivers. Such a plug will jam an extractor having drivers mounted on fixed shafts, thus slowing the renewal process and sometimes injuring the extractor itself.

Accordingly, it is an object of this invention to provide a high speed tube remover capable of use within various sized tubes, which is jam-free, and which overcomes other deficiencies of the prior art.

SUMMARY OF THE INVENTION

The invention provides a tube extractor comprising two rotary drivers respectively mounted in two housings for rotation about spaced apart parallel axes. The facing or adjacent surfaces of the drivers and housings define between them a passageway for axial movement of a tube. The housings are slidably mounted on rods interconnecting the housing, whereby the distance between them and thus the spacing of the driver axes may be adjusted to accommodate tubes of different diameters. The drivers are spring biased toward each other with a spring force sufficient to deformably grip a tube. When a plug within a tube is encountered as the tube travels between the drivers, the spring bias will be overcome, permitting the housings and drivers to shift apart slightly as the obstruction passes.

The drivers are respectively driven by two positive displacement hydraulic motors. The two hydraulic motors are series-connected, that is, the power fluid exhaust of one supplies the power fluid input for the other. As the hydraulic fluid is incompressible, there is no slippage between the two motors, thereby assuring synchronous co-rotation of the two drivers.

Accordingly, it is an object of the present invention to provide a tube traveler with relatively lightweight means for assuring positive co-rotation on the drivers.

It is another object of the invention to provide such a tube traveler in which the distance between the shafts mounting the drivers is relatively easily adjustable, to accommodate tubes having diameters of different sizes.

It is a further object of the invention to provide a tube traveler in which the driver shafts are moveable relative to each other during operation, to compensate for varying the degree of tube deformation, while still maintaining synchronous co-rotation of the drivers.

Other objects and advantages will be apparent to those skilled in the art from the following detailed description of a preferred embodiment.

DESCRIPTION OF A PREFERRED EMBODIMENT

Figure 1:
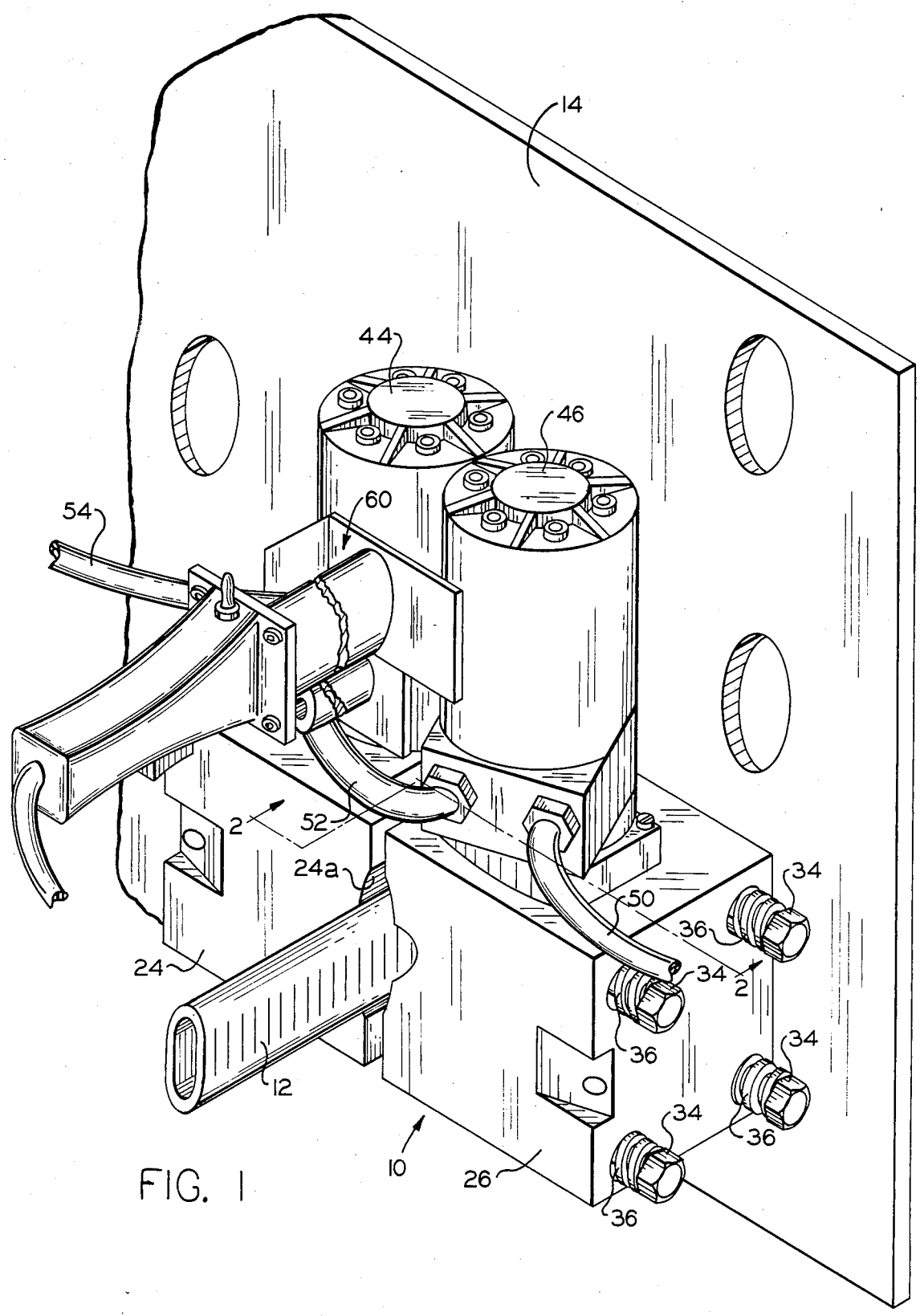
FIG. 1 is a perspective view showing a tube traveler in accordance with the present invention, pulling a tube from a tube sheet in a heat exchanger.
Figure 2:
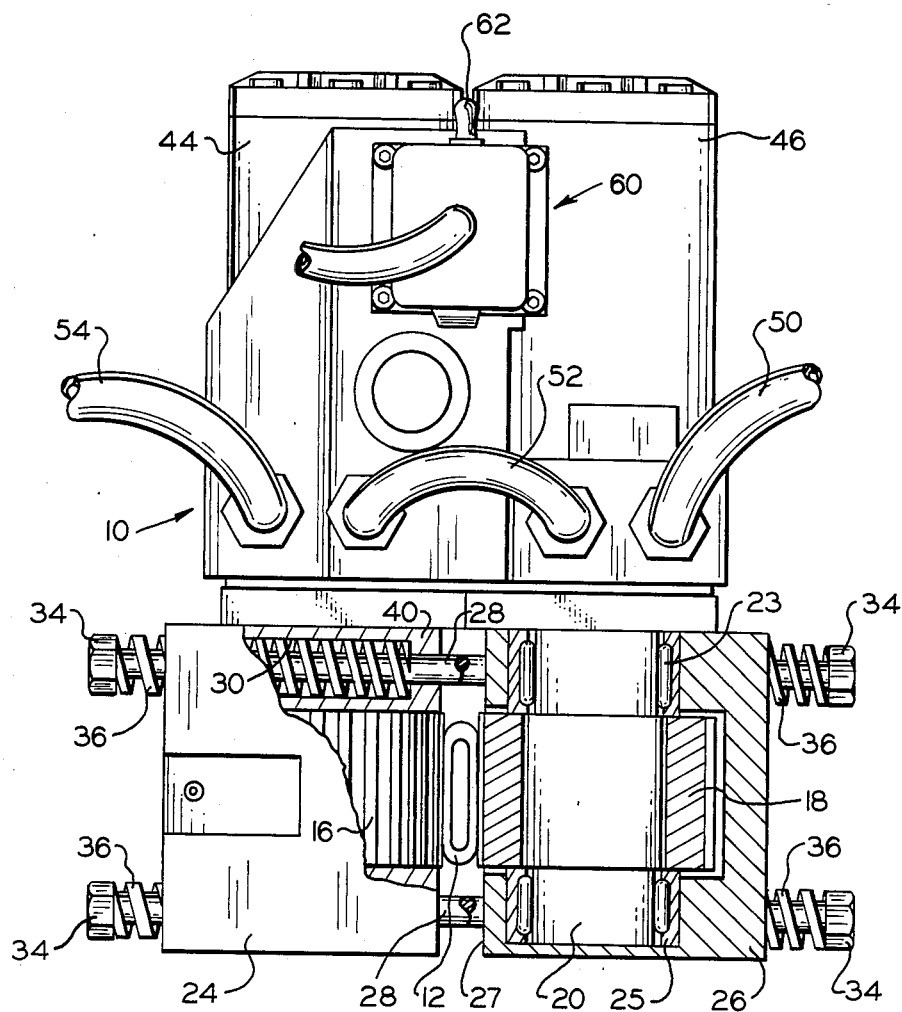
FIG. 2 is a vertical cross-sectional view of a tube traveler taken along line 2—2 of FIG. 1.

FIG. 1 illustrates a tube extractor 10 in accordance with the present invention in the process of extracting a tube 12 from a tube sheet 14 of a heat exchanger. The tube 12 has already been partially extracted, by any known means, such as the tool disclosed in U.S. Pat. No. 3,835,520, to present an exposed end of the tube 12 for gripping by the tube extractor 10.

The extractor 10 includes two opposed rotatable drivers 16, 18 adapted for engaging between them the tube 12 and pulling it from the tube sheet 14. The drivers 16, 18 are respectively mounted on parallel shafts 20. Each shaft 20 is mounted on two sets of bearings 23 press fit into the housings 24 and 26. As illustrated, in operation, the housing 24 and 26 abut the tube sheet 14 and define between their facing surfaces 25 and 27 a passageway for axial movement of a tube 12.

To assure appropriate spacing between the drivers 16 and 18 for proper gripping of the tubes 12, means are provided for adjusting the distance between housings 24 and 26. Housings 24 and 26 are positioned relative to each other by a plurality of parallel rods 28. The rods 28 are perpendicular to the axis of the passageway defined between the housings 24 and 26. Each rod 28 extends from the outside of housing 24, through a countersunk bore 30 in housing 24, across the passageway between the housings, and through a coaxial countersunk bore formed through housing 26. The ends of rods 28 are threaded for stop nuts 34 which limit the separation between the housing 24 and 26, and thus the width of the passageway between them and the size of the nip between the drivers 16 and 18.

Helical springs 36 respectively surround each rod 28. The springs 36 associated with housing 24 extend into the countersunk bores 30 and are retained between stop nuts 34 and the end face of the countersunk bore which defines a reduced diameter bore section adjacent the inside surface 25 of the housing 24. Similarly springs 36 associated with housing 26 extend into countersunk bores formed in housing 26, and are retained between stop nuts 34 and the end face defining a reduced diameter bore.

Springs 36 will resist separation of the drivers 36 and 18 beyond a preselected distance. This distance and more importantly the compressive force on a tube 12 between the drivers 16, 18 may be adjsted by means of stop nuts 34 which adjust the effective length of the rods 28. Preferably, the compressive force is sufficient to deform a tube 12 in the nip between the drivers 16 and 18, as illustrated in FIG. 1, to assure good engagement and traction by the teeth on the drivers 16 and 18.

Tubes may sometimes be encountered which have excessive internal scale deposits forming a plug within the tube 12 that resists crushing. In such a situation, the spring bias mounting of the drivers 16 and 18 prevents a tube 12 jamming between them. Instead, the drivers 16 and 18 merely follow the outer contour of the tube 12, shifting the housings 24 and 26 apart and compressing the springs 36. As the obstruction passes, the springs 36 return the housings 24 and 26 and the drivers 16 and 18 to their original position, thus providing a continuous gripping force on the tube 12.

It has been found advantageous to rotate all drivers synchronously to achieve the most reliable gripping force against a tube. In prior art devices, a drive chain including spur gears between driver shafts has been employed to achieve this necessary positive co-rotation. Such gear structure, however, results in a heavy structure subject to wear and friction. More importantly, an extractor with geared together shafts has limited shock absorption capacity, if the shafts are fixed relative to each other.

To achieve these problems of known tube pullers, the two drivers 16 and 18 of the tube extractor 10 are rotated respectively by two series-connected, positive displacement hydraulic motors 44 and 46. The motor 44 is bolted to the housing 24 and its shaft is connected to the shaft 20 of the driver 16. Similarly, the second hydraulic motor 46 is bolted to the housing 26 and drives the shaft 22 of the second driver 18. The motor 46 receives the hydraulic power fluid under pressure through a line 50. Exhaust hydraulic fluid is carried by a line 52 from the outlet of the first motor 46 to the inlet of the second hydraulic motor 44. Exhaust hydraulic fluid from the motor 44 is recirculated through a line 54 to the source of the pressurized hydraulic fluid. Thus there exists the same flow rate through each motor 44 and 46 and the same pressure drop across each motor 44 and 46. As the hydraulic fluid is incompressible, the hydraulic motors 44 and 46 are continuously driven at the same speed and power.

The hydraulic motors 44 and 46 are actuated by a solenoid controlled valve. The valve (not illustrated) is within the sealed housing of the motor 44, and is responsive to a magnetic field. A handle 60 rigidly secured to the housing of the motor 44 contains a solenoid coil (not illustrated) and a control switch 62 therefor. The handle 60 is preferably slanted away from the axis of the tube 12, so that the tube extractor can more easily be operated from a safe position to the side of the tube 12.

The above described embodiment provides a tube traveler which is efficient in operation and mechanically simple. Seriers-connected positive displacement motors replace less reliable spur gears as a means to provide synchronous co-rotation of the drivers. This drive system permits an arrangement in which the motor and drivers are shiftably mounted relative to each other, thus eliminating the possibility of the tube jamming. Adjustable spring biased mounting of the drivers permits selecting of a gripping force sufficient to deformably grip tubes of different diameters.

Although a preferred embodiment of the invention has been described in detail, various modifications and changes may be made without departing from the spirit and scope of the invention as defined in the appended claims.

I claim:

1. A tube traveler for axially removing a metal tube mounted in an opening formed through a tube sheet, the tube being sized to fit in interfering relationship with the opening and exerting a relatively large amount of resistance to such axial removal, said tube traveler comprising in combination:

a pair of adjacent housings, each of said housings having a rear face adapted for abutment against such tube sheet and a facing surface, each of said housings containing a rotary driver journalled for rotation within said housing and positioned such that the periphery of each driver extends beyond said facing surface;

motor means connected to each of said rotary drivers and effective to synchronously drive the same in opposite directions;

means for positioning said housings such that said facing surfaces face each other while permitting relative movement of said housings; and means for biasing said housings toward each other such that said peripheries of said rotary drivers normally engage and substantially deform a tube therebetween to translate such tube along its axis, said biasing means allowing said housings to separate beyond said normal position such that said rotary drivers may pass over a portion of such tube therebetween which cannot be substantially deformed.

2. The tube traveler of claim 1 wherein said positioning means includes a plurality of rods extending through said housings transversely across said tube path and said biasing means positions said housings to provide a normal extension of said drivers into said tube path, said bias means exerting sufficient lateral force upon said tubes to substantially deform the same when passing along said tube path between said rotary drivers.

3. The tube traveler of claim 2 wherein said bias means comprise annular compression springs circumjacent said rods and adapted to urge said housings toward said normal position.

4. The tube traveler of claim 3 which further includes means for adjusting the amount of compression on such compression springs when in said normal position.

5. The tube traveler of claim 1 wherein said motor means includes a positive displacement hydraulic motor connected to each of said rotary drivers.

6. The tube traveler of claim 5 wherein each of said rotary drivers is directly secured to the output shaft of said hydraulic motor such that the rotary speed of said driver and motor are equal.

* * * * *